(12) United States Patent
Shang et al.

(10) Patent No.: US 11,562,251 B2
(45) Date of Patent: Jan. 24, 2023

(54) LEARNING WORLD GRAPHS TO ACCELERATE HIERARCHICAL REINFORCEMENT LEARNING

(71) Applicant: salesforce.com, inc., San Francisco, CA (US)

(72) Inventors: Wenling Shang, San Francisco, CA (US); Alexander Richard Trott, San Francisco, CA (US); Stephan Tao Zheng, Redwood City, CA (US)

(73) Assignee: Salesforce.com, Inc., San Francisco, CA (US)

( * ) Notice: Subject to any disclaimer, the term of this patent is extended or adjusted under 35 U.S.C. 154(b) by 780 days.

(21) Appl. No.: 16/533,575

(22) Filed: Aug. 6, 2019

(65) Prior Publication Data

US 2020/0364580 A1 Nov. 19, 2020

Related U.S. Application Data

(60) Provisional application No. 62/852,256, filed on May 23, 2019, provisional application No. 62/848,709, filed on May 16, 2019.

(51) Int. Cl.
| | | |
|---|---|---|
| *G06N 3/08* | (2006.01) | |
| *G05D 1/02* | (2020.01) | |
| *G06N 3/04* | (2006.01) | |

(52) U.S. Cl.
CPC ........... *G06N 3/088* (2013.01); *G05D 1/0221* (2013.01); *G06N 3/0445* (2013.01)

(58) Field of Classification Search
CPC ...... G06N 3/088; G06N 3/0445; G06N 3/006; G06N 3/0472; G06N 3/0454; G05D 1/0221
See application file for complete search history.

(56) References Cited

U.S. PATENT DOCUMENTS

| | | |
|---|---|---|
| 10,282,663 B2 | 5/2019 | Socher et al. |
| 10,346,721 B2 | 7/2019 | Albright et al. |
| 10,474,709 B2 | 11/2019 | Paulus |
| 10,521,465 B2 | 12/2019 | Paulus |
| 10,542,270 B2 | 1/2020 | Zhou et al. |
| 10,546,217 B2 | 1/2020 | Albright et al. |
| 10,733,506 B1 * | 8/2020 | Ogale ............. G06N 3/084 |
| 10,970,441 B1 * | 4/2021 | Zhang ............. G06N 3/063 |

(Continued)

FOREIGN PATENT DOCUMENTS

CN 113568675 A * 10/2021

OTHER PUBLICATIONS

Abbeel et al., "Apprenticeship Learning via Inverse Reinforcement Learning," In Proceedings of the Twenty-First International Conference on Machine Learning, ACM, 2004, 1 page.

(Continued)

*Primary Examiner* — Babar Sarwar
(74) *Attorney, Agent, or Firm* — Haynes and Boone LLP

(57) ABSTRACT

Systems and methods are provided for learning world graphs to accelerate hierarchical reinforcement learning (HRL) for the training of a machine learning system. The systems and methods employ or implement a two-stage framework or approach that includes (1) unsupervised world graph discovery, and (2) accelerated hierarchical reinforcement learning by integrating the graph.

18 Claims, 9 Drawing Sheets

(56) References Cited

U.S. PATENT DOCUMENTS

| | | | | |
|---|---|---|---|---|
| 11,169,288 | B1* | 11/2021 | Johnson | G01V 1/306 |
| 11,188,766 | B2* | 11/2021 | Rahimpour | G06V 10/82 |
| 11,216,717 | B2* | 1/2022 | Baum | G06F 30/27 |
| 11,243,532 | B1* | 2/2022 | Levihn | B60W 60/0011 |
| 11,328,210 | B2* | 5/2022 | Mondello | G06N 3/08 |
| 2016/0350653 | A1 | 12/2016 | Socher et al. | |
| 2017/0024645 | A1 | 1/2017 | Socher et al. | |
| 2017/0032280 | A1 | 2/2017 | Socher | |
| 2017/0140240 | A1 | 5/2017 | Socher | |
| 2018/0082171 | A1 | 3/2018 | Merity et al. | |
| 2018/0096219 | A1 | 4/2018 | Socher | |
| 2018/0121787 | A1 | 5/2018 | Hashimoto et al. | |
| 2018/0121788 | A1 | 5/2018 | Hashimoto et al. | |
| 2018/0121799 | A1 | 5/2018 | Hashimoto et al. | |
| 2018/0129931 | A1 | 5/2018 | Bradbury et al. | |
| 2018/0129937 | A1 | 5/2018 | Bradbury et al. | |
| 2018/0129938 | A1 | 5/2018 | Xiong et al. | |
| 2018/0143966 | A1 | 5/2018 | Lu et al. | |
| 2018/0144208 | A1 | 5/2018 | Lu et al. | |
| 2018/0144248 | A1 | 5/2018 | Lu et al. | |
| 2018/0268287 | A1 | 9/2018 | Johansen et al. | |
| 2018/0268298 | A1 | 9/2018 | Johansen et al. | |
| 2018/0300317 | A1 | 10/2018 | Bradbury | |
| 2018/0336198 | A1 | 11/2018 | Zhong et al. | |
| 2018/0336453 | A1 | 11/2018 | Merity et al. | |
| 2018/0349359 | A1 | 12/2018 | McCann et al. | |
| 2018/0373682 | A1 | 12/2018 | McCann et al. | |
| 2018/0373987 | A1 | 12/2018 | Zhang et al. | |
| 2019/0130206 | A1 | 5/2019 | Trott et al. | |
| 2019/0130248 | A1 | 5/2019 | Zhong et al. | |
| 2019/0130249 | A1 | 5/2019 | Bradbury et al. | |
| 2019/0130273 | A1 | 5/2019 | Keskar et al. | |
| 2019/0130312 | A1 | 5/2019 | Xiong et al. | |
| 2019/0130896 | A1 | 5/2019 | Zhou et al. | |
| 2019/0130897 | A1 | 5/2019 | Zhou et al. | |
| 2019/0147255 | A1* | 5/2019 | Homayounfar | G06N 20/00 701/23 |
| 2019/0169962 | A1* | 6/2019 | Aqrawi | G01V 1/50 |
| 2019/0188568 | A1 | 6/2019 | Keskar et al. | |
| 2019/0204842 | A1* | 7/2019 | Jafari Tafti | B60W 60/0011 |
| 2019/0213482 | A1 | 7/2019 | Socher et al. | |
| 2019/0243372 | A1* | 8/2019 | Huval | G05D 1/0214 |
| 2019/0251168 | A1 | 8/2019 | McCann et al. | |
| 2019/0251431 | A1 | 8/2019 | Keskar et al. | |
| 2019/0258714 | A1 | 8/2019 | Zhong et al. | |
| 2019/0258939 | A1 | 8/2019 | Min et al. | |
| 2019/0286073 | A1 | 9/2019 | Hosseini-Asl et al. | |
| 2019/0295530 | A1 | 9/2019 | Hosseini-Asl et al. | |
| 2019/0362020 | A1 | 11/2019 | Paulus et al. | |
| 2020/0174490 | A1* | 6/2020 | Ogale | G05D 1/0221 |
| 2020/0209872 | A1* | 7/2020 | Xu | G06N 5/046 |
| 2020/0301437 | A1* | 9/2020 | Misu | G06N 3/08 |
| 2020/0357516 | A1* | 11/2020 | Kirby | G06N 3/08 |
| 2020/0372412 | A1* | 11/2020 | Garcia-Morchon | G06N 3/0481 |
| 2020/0382531 | A1* | 12/2020 | Albero | G06N 3/08 |
| 2021/0049467 | A1* | 2/2021 | Riedmiller | G06N 3/0445 |
| 2021/0192358 | A1* | 6/2021 | Song | G06N 3/0454 |
| 2021/0312725 | A1* | 10/2021 | Milton | G06N 3/0454 |
| 2021/0326389 | A1* | 10/2021 | Sankar | G06N 5/022 |
| 2021/0365611 | A1* | 11/2021 | Agrawal | G06F 16/284 |
| 2021/0374530 | A1* | 12/2021 | Mahkonen | G06N 3/10 |

OTHER PUBLICATIONS

Achiam et al., "Surprise-Based Intrinsic Motivation for Deep Reinforcement Learning," arXiv preprint arXiv:1703.01732, 2017.
Angeli et al., "A Fast and Incremental Method for Loop-Closure Detection Using Bags of Visual Words," IEEE Transactions on Robotics, 2008, pp. 1027-1037.
Azar et al., "World Discovery Model," arXiv, 2019.
Ba et al., "Multiple Object Recognition With Visual Attention," arXiv preprint arXiv:1412.7755, 2014.
Bacon et al., "The Option-Critic Architecture," In Thirty-First AAAI Conference on Artificial Intelligence, pp. 1726-1734, 2017.
Barreto et al., "Successor Features for Transfer in Reinforcement Learning," In Advances in Neural Information Processing Systems, 2017, pp. 4055-4065.
Basting et al., "Interpretable Neural Predictions With Differentiable Binary Variables," Proceedings of the 57th Annual Meeting of the Association for Computational Linguistics, 2019, pp. 2963-2977.
Bertsekas, "Dynamic Programming and Optimal Control," vol. 1, Third Edition, 2005.
Bertsekas, "Nonlinear Programming," Second edition, 1999.
Biggs, "Algebraic Graph Theory," 1993.
Blei et al., "Topic Segmentation With an Aspect Hidden Markov Model," In Proceedings of the 24th Annual International ACM SIGIR Conference on Research and Development in Information Retrieval, ACM, 2001, pp. 343-348.
Blei et al., "Variational Inference: A Review for Statisticians," Journal of the American Statistical Association, 2017, pp. 859-877.
Burda et al., "Large-Scale Study of Curiosity-Driven Learning," arXiv preprint arXiv:1808.04355, 2018.
Chan et al., "Latent Sequence Decompositions," arXiv preprint arXiv:1610.03035, 2016.
Chatzigiorgaki et al., "Real-Time Keyframe Extraction Towards Video Content Identification," In 2009 16th International Conference on Digital Signal Processing, IEEE, 2009, pp. 1-6.
Chevalier-Boisvert et al., "Minimalistic Gridworld Environment for Openai Gym," https://github.com/maximecb/gym-minigrid, 2018.
Chung et al., "A Recurrent Latent Variable Model for Sequential Data," In Advances in Neural Information Processing Systems, 2015, pp. 2980-2988.
Co-Reyes et al., "Self-Consistent Trajectory Autoencoder: Hierarchical Reinforcement Learning With Trajectory Embeddings," arXiv preprint arXiv:1806.02813, 2018.
Dayan et al., "Feudal Reinforcement Learning," In Advances in Neural Information Processing Systems, 1993, pp. 271-278.
Donahue et al., "Decaf: A Deep Convolutional Activation Feature for Generic Visual Recognition," In International Conference on Machine Learning, 2014, pp. 647-655.
Dwiel et al., "Hierarchical Policy Learning is Sensitive to Goal Space Design," arXiv preprint, (2), 2019.
Ecoffet et al., "Go-Explore: A New Approach for Hard-Exploration Problems," arXiv preprint arXiv:1901.10995, 2019.
Feng et al., "Dynamic Programming for Structured Continuous Markov Decision Problems," In Proceedings of the 20th Conference on Uncertainty in Artificial Intelligence, AUAI Press, 2004, pp. 154-161.
Finn et al., "Model-Agnostic Meta-Learning for Fast Adaptation of Deep Networks," In Proceedings of the 34th International Conference on Machine Learning, JMLR. org, 2017, pp. 1126-1135.
Fox et al., "Active Markov Localization for Mobile Robots," Robotics and Autonomous Systems, 1998, pp. 195-207.
Fox et al., "Multi-Level Discovery of Deep Options," arXiv preprint arXiv:1703.08294, 2017.
Ghosh et al., "Learning Actionable Representations With Goal-Conditioned Policies," arXiv preprint arXiv:1811.07819, 2018.
Gregor et al., "Draw: A Recurrent Neural Network for Image Generation," Proceedings of the 32nd International Conference on Machine Learning, 2015.
Gregor et al., "Temporal Difference Variational Auto-Encoder," arXiv preprint arXiv:1806.03107, 2018.
Guo et al., "Neural Predictive Belief Representations," arXiv preprint arXiv:1811.06407, 2018.
Ha et al., "World Models," arXiv preprint arXiv:1803.10122, 2018.
Haarnoja et al., "Latent Space Policies for Hierarchical Reinforcement Learning," arXiv preprint arXiv:1804.02808, 2018.
Hafner et al., "Learning Latent Dynamics for Planning from Pixels," arXiv preprint arXiv:1811.04551, 2018.
Hausman et al., "Learning an Embedding Space for Transferable Robot Skills," In International Conference on Learning Representations, 2018.
Henderson et al., "Deep Reinforcement Learning That Matters," In Thirty-Second AAAI Conference on Artificial Intelligence, 2018.

(56) References Cited

OTHER PUBLICATIONS

Higgins et al., "Beta-Vae: Learning Basic Visual Concepts With a Constrained Variational Framework," In International Conference on Learning Representations (ICLR), 2017.
Higgins et al., "Scan: Learning Hierarchical Compositional Visual Concepts," arXiv preprint arXiv:1707.03389, 2017.
Hussein et al., "Imitation Learning: A Survey of Learning Methods," ACM Computing Surveys (CSUR), 2017, Article No. 21.
Jayaraman et al., "Time-Agnostic Prediction: Predicting Predictable Video Frames," arXiv preprint arXiv:1808.07784, 2018.
Kaelbling et al., "Planning and Acting in Partially Observable Stochastic Domains," Artificial Intelligence, 1998, pp. 99-134.
Kaiser et al., "Model-Based Reinforcement Learning for Atari," arXiv preprint arXiv:1903.00374, 2019.
Kingma et al., "Auto-Encoding Variational Bayes," In International Conference on Learning Representations (ICLR), 2013.
Kipf et al., "Compositional Imitation Learning: Explaining and Executing One Task at a Time," arXiv preprint arXiv: 1812.01483, 2018.
Kroemer et al., "Towards Learning Hierarchical Skills for Multi-Phase Manipulation Tasks," In 2015 IEEE International Conference on Robotics and Automation (ICRA), IEEE, 2015, pp. 1503-1510.
Kulkarni et al., "Hierarchical Deep Reinforcement Learning: Integrating Temporal Abstraction and Intrinsic Motivation," In Advances in Neural Information Processing Systems, 2016, pp. 3675-3683.
Le et al., "A Simple Way to Initialize Recurrent Networks of Rectified Linear Units," arXiv preprint arXiv:1504.00941, 2015.
Leon et al., "Options Discovery With Budgeted Reinforcement Learning," arXiv preprint arXiv:1611.06824, 2016.
Levy et al., "Hierarchical Actor-Critic," arXiv preprint arXiv:1712.00948, 2017.
Li et al., "Active Localization With Dynamic Obstacles," In 2016 IEEE/RSJ International Conference on Intelligent Robots and Systems (JROS), IEEE, 2016, pp. 1902-1909.
Littman, "Algorithms for Sequential Decision Making," 1996.
Louizos et al., "Learning Sparse Neural Networks Through l_0 Regularization," arXiv preprint arXiv:1712.01312, 2017.
Lowry et al., "Visual Place Recognition: A Survey," Transactions on Robotics, IEEE, 2015, pp. 1-19.
Maddison et al., "The Concrete Distribution: A Continuous Relaxation of Discrete Random Variables," arXiv preprint arXiv:1611.00712, 2016.
Marthi et al., "Concurrent Hierarchical Reinforcement Learning," AAAI-05 Doctoral Consortium, 2005, pp. 1652-1653.
Mishkin et al., "All You Need Is a Good Init," arXiv preprint arXiv:1511.06422, 2015.
Mnih et al., "Asynchronous Methods for Deep Reinforcement Learning," In International Conference on Machine Learning, 2016, pp. 1928-1937.
Mnih et al., "Strategic Attentive Writer for Learning Macro-Actions," arXiv preprint arXiv:1606.04695, 2016.
Nachum et al., "Data-Efficient Hierarchical Reinforcement Learning," In Advances in Neural Information Processing Systems, 2018, pp. 3303-3313.
Nachum et al., "Near-Optimal Representation Learning for Hierarchical Reinforcement Learning," arXiv preprint arXiv:1810.01257, 2018.
Nair et al., "Visual Reinforcement Learning With Imagined Goals," In Advances in Neural Information Processing Systems, 2018, pp. 9191-9200.
Nalisnick et al., "Stick-Breaking Variational Autoencoders," arXiv preprint arXiv:1605.06197, 2016.
NASA, "The Scientific Objectives of the Mars Exploration Rover," 2015.
Niekum et al., "Incremental Semantically Grounded Learning from Demonstration," Robotics Science and Systems (RSS), 2013.
Ostrovski et al., "Count-Based Exploration With Neural Density Models," In International Conference on Machine Learning (ICML), 2017, pp. 2721-2730.
Pathak et al., "Curiosity-Driven Exploration by Self-Supervised Prediction," In Proceedings of the IEEE Conference on Computer Vision and Pattern Recognition Workshops, 2017, pp. 16-17.
Pertsch et al., "Keyin: Discovering Subgoal Structure With Keyframe-Based Video Prediction," arXiv, 2019.
Racaniere et al., "Imagination-Augmented Agents for Deep Reinforcement Learning," In Advances in Neural Information Processing Systems, 2017, pp. 5690-5701.
Rezende et al., "Stochastic Backpropagation and Approximate Inference in Deep Generative Models," In International Conference on Machine Learning (ICML), 2014, pp. II-1278-II-1286.
Russo et al., "A Tutorial on Thompson Sampling," Foundations and Trends (Registered) in Machine Learning, 2018, pp. 1-96.
Shang et al., "Stochastic Activation Actor-Critic Methods," 2018.
Sutton, "Introduction to Reinforcement Learning," 2nd edition, vol. 135, 2015.
Taylor et al., "Transfer Learning for Reinforcement Learning Domains: A Survey," Journal of Machine Learning Research, 2009, pp. 1633-1685.
Thrun, "Learning Metric-Topological Maps for Indoor Mobile Robot Navigation," Artificial Intelligence, 1998, pp. 21-71.
Tian et al., "Latent Forward Model for Real-Time Strategy Game Planning With Incomplete Information," In NIPS Symposium, 2017.
Vaswani et al., "Attention Is All You Need," In Advances in Neural Information Processing Systems, 2017, pp. 5998-6008.
Vezhnevets et al., "Feudal Networks for Hierarchical Reinforcement Learning," In Proceedings of the 34th International Conference on Machine Learning, JMLR. org, 2017, pp. 3540-3549.
Wu et al., "Scalable Trust-Region Method for Deep Reinforcement Learning Using Kronecker-Factored Approximation," In Neural Information Processing Systems (NIPS), 2017, pp. 5285-5294.
Wu et al., "Training Agent for First-Person Shooter Game With Actor-Critic Curriculum Learning," 2016.
You et al., "Image Captioning With Semantic Attention," In Proceedings of the IEEE Conference on Computer Vision and Pattern Recognition, 2016, pp. 4651-4659.
Fritz et al., "Attentive Object Detection Using an Information Theoretic Saliency Measure," In International Workshop on Attention and Performance in Computational Vision, Springer, 2004, pp. 29-41.
Pane et al., "Actor-Critic Reinforcement Learning for Tracking Control in Robotics," In Decision and Control (CDC), 2016 IEEE 55th Conference on IEEE, 2016, pp. 5819-5826.
Weiss, "Dynamic Programming and Markov Processes," 1960.

\* cited by examiner

FIG. 8

LEARNING WORLD GRAPHS TO ACCELERATE HIERARCHICAL REINFORCEMENT LEARNING

RELATED APPLICATIONS

This application claims priority to U.S. Provisional Patent Application No. 62/848,709 filed May 16, 2019, and U.S. Provisional Patent Application No. 62/852,256 filed May 23, 2019, each of which is incorporated by reference herein in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates generally to training and use of machine learning systems, and more specifically, to learning world graphs to accelerate hierarchical reinforcement learning.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Artificial intelligence—implemented with, for example, a machine learning system—has demonstrated great promise as a technique for automatically analyzing real-world information with human-like accuracy. In general, such machine learning system receives input information and makes predictions based on the input information. This allows the machine learning system to function or operate as an autonomous agent.

BRIEF DESCRIPTION OF THE DRAWINGS

FIG. 8 is a table summarizing testing results, according to some embodiments.

Figure 1:
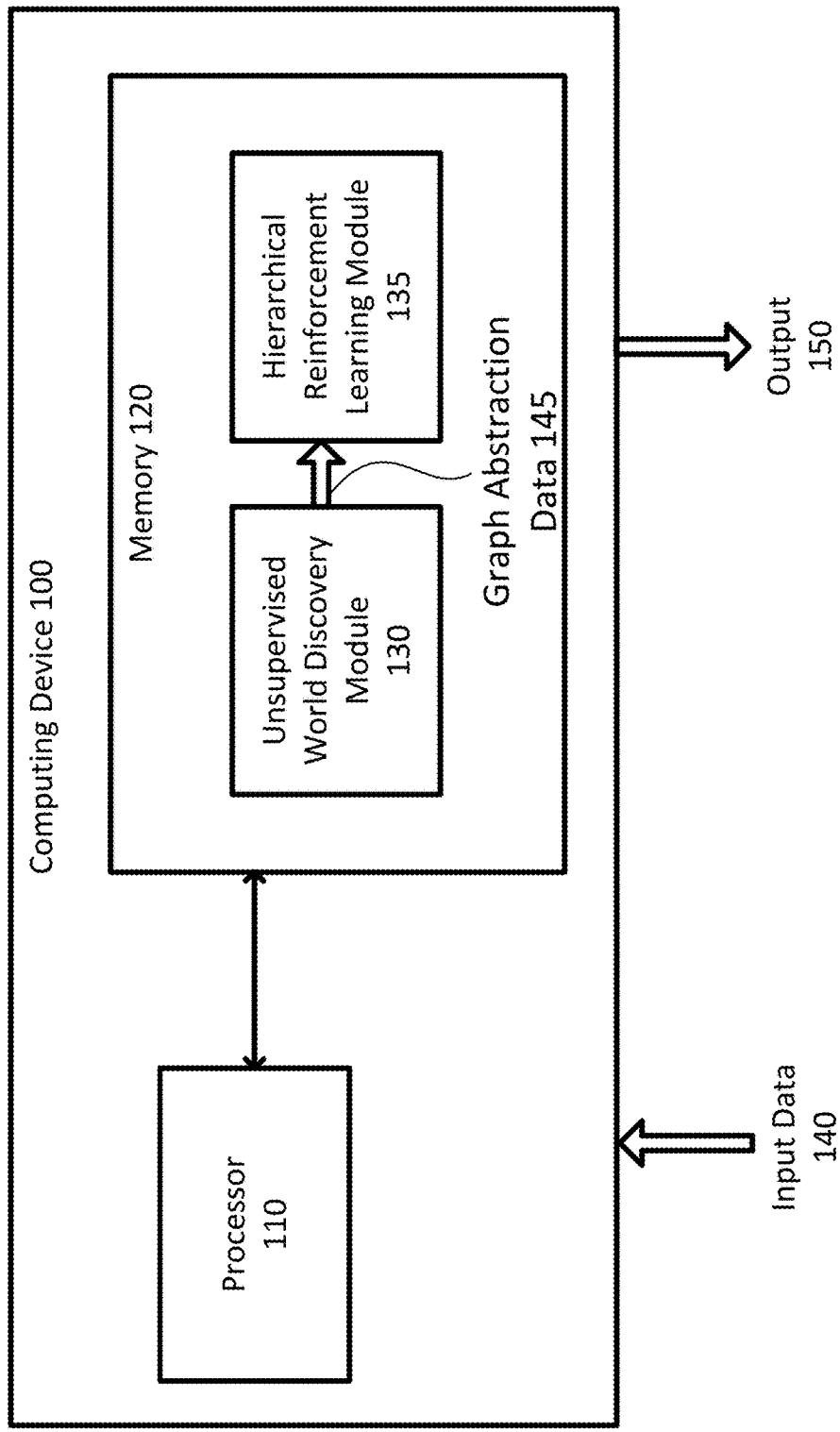
FIG. 1 is a simplified diagram of a computing device, according to some embodiments.

In the figures and appendix, elements having the same designations have the same or similar functions.

DETAILED DESCRIPTION

This description and the accompanying drawings that illustrate aspects, embodiments, implementations, or applications should not be taken as limiting—the claims define the protected invention. Various mechanical, compositional, structural, electrical, and operational changes may be made without departing from the spirit and scope of this description and the claims. In some instances, well-known circuits, structures, or techniques have not been shown or described in detail as these are known to one skilled in the art Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Artificial intelligence—implemented with, for example, a machine learning system—can be incorporated into, or function or operate as, an autonomous agent. The autonomous agent receives and analyzes real-world information and makes predictions or decisions based on the same. In many real-world scenarios, an autonomous agent may encounter or be assigned to carry out various tasks within a complex environment. For example, a Mars rover carries out or executes scientific objectives ranging from searching for rocks to calibrating orbiting instruments. Intuitively, a good understanding of the high-level structure of its operational environment or world would help an agent accomplish its downstream tasks. In reality, however, both acquiring such world knowledge and effectively applying it to solve tasks are often challenging.

To address these challenges, according to some embodiments, the present disclosure provides systems and methods for learning world graphs to accelerate hierarchical reinforcement learning (HRL) for the training of the machine learning system. In some embodiments, the systems and methods employ or implement a two-stage framework or approach that includes (1) unsupervised world graph discovery and (2) accelerated hierarchical reinforcement learning by integrating the graph.

According to some embodiments, the first stage proposes an unsupervised module to learn world graphs for the target environment, including a novel recurrent differentiable binary latent model and a curiosity-driven goal-conditioned policy or agent. In the first stage, the systems and methods build a graph abstraction over the environment structure.

The graph abstraction utilizes or defines nodes and edges, where nodes are important points of interest (pivotal states) and edges represent feasible traversals between the nodes. The systems and methods jointly train a world discovery model and a curiosity-driven goal-conditioned policy or agent in a task-agnostic manner.

According to some embodiments, the second stage proposes a general HRL scheme with novel components such as a Wide-then-Narrow (WN) instruction and navigating via world graph traversal. In the second stage, in some embodiments, a high-level controller, i.e., Manager, uses the world graph to quickly find solutions to new tasks and expresses subgoals in reference to their nearby pivotal states to a low-level controller, i.e., Worker. The Worker then can also use the graph to traverse and explore in long range.

In other words, the two-stage framework enables agents to learn high-level world structure in the form of a simple graph and integrates this into a hierarchical policy model.

The two-stage approach of the present disclosure has been evaluated in an ablation study on a suite of challenging maze tasks, demonstrating significant advantages to other approaches that lack world graph knowledge in terms of aptitude and efficiency.

Quantitative and qualitative empirical findings over a complex two-dimensional (2D) maze domain show that the proposed framework 1) produces a graph descriptor representative of the world and 2) significantly improves both sample efficiency and final performance in solving downstream tasks as compared to baselines that lack such descriptor.

In some embodiments, the systems and methods of the present disclosure may employ or be implemented with one or more neural networks, deep learning models, machine learning systems, or the like.

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

Computing Device

According to some embodiments, the systems of the present disclosure—including the various networks, models, and modules—can be implemented in one or more computing devices.

FIG. 1 is a simplified diagram of a computing device 100 according to some embodiments. According to some embodiments, computing device 100 may be used to implement an agent that can provide computer instructions to a robot or other mobile automated system for navigating and performing tasks in an unknown environment. In some embodiments, computing device 100 may be incorporated into the robot or automated system. In some embodiments, the computing device may be separate from the robot or automated system, but in communication with the same, for example, over wireless signaling, to exchange data, information, and control.

As shown in FIG. 1, computing device 100 includes a processor 110 coupled to memory 120. Operation of computing device 100 is controlled by processor 110. And although computing device 100 is shown with only one processor 110, it is understood that processor 110 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 100. Computing device 100 may be implemented as a stand-alone subsystem, as a board added to a computing device, and/or as a virtual machine.

Memory 120 may be used to store software executed by computing device 100 and/or one or more data structures used during operation of computing device 100. Memory 120 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 110 and/or memory 120 may be arranged in any suitable physical arrangement. In some embodiments, processor 110 and/or memory 120 may be implemented on a same board, in a same package (e.g., system-in-package), on a same chip (e.g., system-on-chip), and/or the like. In some embodiments, processor 110 and/or memory 120 may include distributed, virtualized, and/or containerized computing resources. Consistent with such embodiments, processor 110 and/or memory 120 may be located in one or more data centers and/or cloud computing facilities.

As shown, memory 120 includes an unsupervised world discovery module 130 and a hierarchical reinforcement learning module 135 that may be used to implement and/or emulate the systems and models, and/or to implement any of the methods described further herein. In some embodiments, an unsupervised world discovery module 130 may be used to perform unsupervised world discovery and to develop, derive, or generate one or more graphs based on same. In some embodiments, hierarchical reinforcement learning module 135 may be used to develop, derive, generate, or perform accelerated hierarchical reinforcement learning (HRL) by integrating the graphs. In some examples, memory 120 may include non-transitory, tangible, machine readable media that includes executable code that when run by one or more processors (e.g., processor 110) may cause the one or more processors to perform the methods described in further detail herein. In some examples, each of unsupervised world discovery module 130 and hierarchical reinforcement learning module 135 may be implemented using hardware, software, and/or a combination of hardware and software. According to some embodiments, the unsupervised world discovery module 130 and hierarchical reinforcement learning module 135 implement, at least in part, aspects of the two-stage framework or approach of the present disclosure.

As shown, computing device 100 receives input data 140. This input data 140 may include data relating to one or more environments, which can be real-world or virtual. In some examples, the environment data 140 may relate to one or more mazes of varying sizes and complexity, through which an autonomous agent may navigate and operate. The input data 140 may also include data relating to one or more tasks that the agent may be assigned to perform in the environment. The environment data 140 is provided to unsupervised world discovery module 130, and the task input data 140 may be provided to the hierarchical reinforcement learning module 135.

Unsupervised world discovery module 130 operates on or learns from the input environment data 140, and based on same, develops, derives, or generates a graph abstraction to capture the high-level structure of the real or virtual world environment. The graph abstraction may include or define nodes and edges, where nodes are important points of interest (pivotal states) and edges represent feasible traversals between the nodes. In some embodiments, unsupervised world discovery module 130 includes or implements a novel recurrent differentiable binary latent model and a curiosity-driven goal-conditioned policy. The information or data 145 for the graph abstraction is provided to the hierarchical reinforcement learning module 135.

Hierarchical reinforcement learning module 135 performs accelerated hierarchical reinforcement learning (HRL) by integrating the graph. The HRL scheme may include or perform a Wide-then-Narrow (WN) instruction and navigating via world graph traversal. In some embodiments, the hierarchical reinforcement learning module 135 incorporates the world graph to accelerate solving specific downstream tasks in the environment, for example, as described or specified in the task input data 140. The implicit knowledge of the world acquired by unsupervised world discovery module 130 and hierarchical reinforcement learning module 135 can be further leveraged in subsequent HRL training. In some embodiments, the computing device 100, based upon the accelerated learning, derives or generates results and predictions which can be, for example, instructions related to navigating in the environment and performing the downstream tasks. These results or predictions are provided as output 150 from computing device 100.

Environment and World Graph

Figure 2:
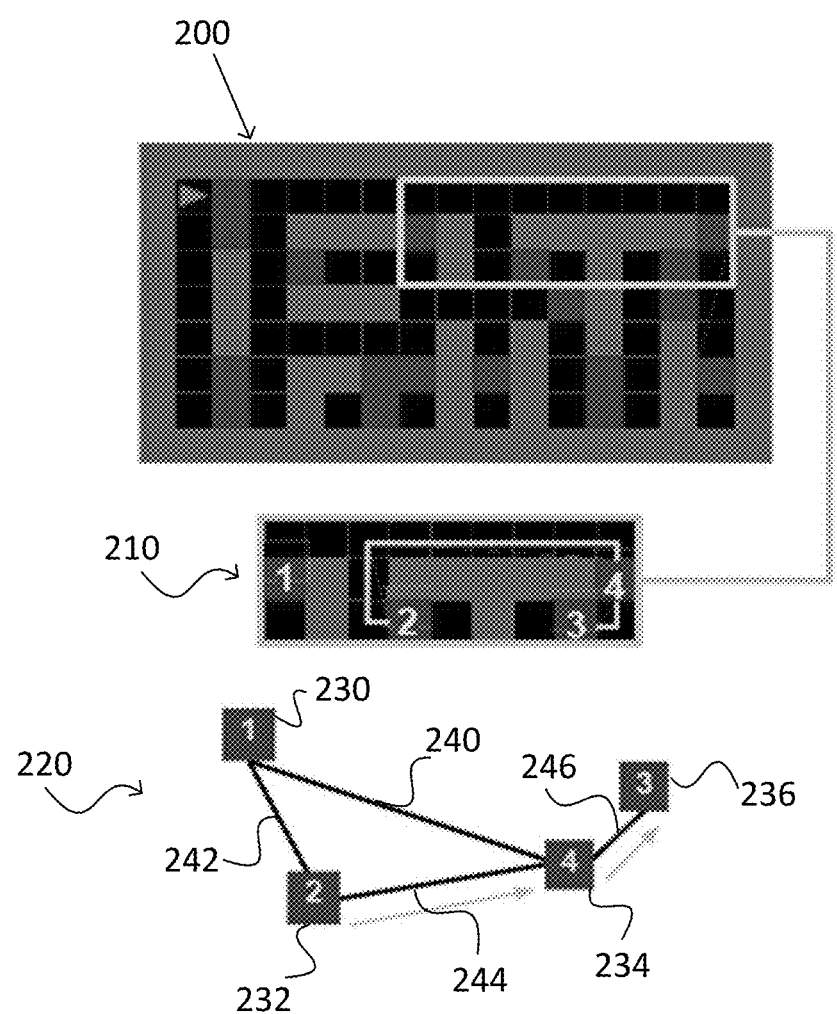
FIG. 2 illustrates an example environment in which an autonomous agent may operate, along with an example of a graph for a world structure representing a portion of the environment, according to some embodiments.

FIG. 2 shows an example environment 200, according to some embodiments. In some examples, as shown, the environment 200 can be complex two-dimensional (2D) mazes through which an autonomous agent may be tested or trained to navigate and perform tasks. In some examples, these environments can be virtual simulations. The environment 200 may include locations (e.g., entrances, exits, intersections), pathways, and obstacles (e.g., walls, doors).

Data or information for the environment may be included in the input environment data 140 provided to the computing device 100 for the autonomous agent. In some embodiments, the maze states received by the agent are in the form of bird-eye view matrix representations.

In some embodiments, the maze environments (e.g., 200) serve as a test or training platform for the autonomous agent. For testing or training, the agent may be given or assigned a task that involves or requires one or more actions ($a_t$), such as, for example, move from one location to another, hit one or more targets, pick up a key, open door with key, and exit. The goal of reinforcement learning is to pick the best known action for any given state ($s_t$), which means the actions have to be ranked, and assigned values relative to one another. The maze environments are finite, fully observable, and deterministic (over each episode). That is, for each state-action pair, the transition $(s_t, a_t) \rightarrow s_{t+1}$ is deterministic, where $s_t \in S$, $a_t \in A$ are finite. More involved environments can introduce interfering factors, shadowing the effects from the proposed method, e.g. the need of a well-calibrated latent goal space.

As shown in FIG. 2, a portion 210 of the environment 200 is extracted for purposes of illustration.

World Graph Discovery

In an initial or first stage of the framework, the autonomous agent learns and explores the environment or portions thereof (e.g., environment 200 or portion 210), and generates a high-level structure or world graph $\mathcal{G}_w$ for representing the same. In some embodiments, the autonomous agent corresponds to or can implement an unsupervised world discovery module (e.g., module 130 in FIG. 1).

In some examples, the agent of the present disclosure collects training trajectories, using both random walks and a simultaneously learned curiosity-driven goal-conditioned policy. The agent also starts exploring from current pivotal states, which may be learned by a latent model (instead of using heuristics). The edges of the graph, extrapolated from both the trajectories and the goal-conditioned policy, correspond to the actionable transitions between close-by pivotal states. The goal-conditioned policy can be used to further promote transfer learning in the next stage.

In some embodiments, the resultant graph $\mathcal{G}_w$ can be simple and directed, capturing the high-level structure of the world. FIG. 2 shows an example graph 220 corresponding to the extracted portion 210 of the environment 200. Graph 220 captures the high-level structure of the extracted portion 210. Graph 220 include nodes (e.g., 230, 232, 234, 236) and edges (e.g., 240, 242, 244, 246). The graph 220 exemplifies how to forge edges and traverse between the pivotal states. That is, the nodes 230-236 are points of interest, or pivotal states $s_p$, that represent or correspond to certain locations in the environment 200. The edges 240-246 represent feasible traversals among the nodes 230-236, and thus correspond to movement from one location to another in the environment 200 (e.g., as indicated by the arrows along edges 244 and 246). Unlike other methods or approaches, the systems and methods of the present disclosure emphasize the connections among neighboring or close-by pivotal states $s_p$ (e.g., nodes 230-236) rather than transitions over any arbitrary ones, which is usually deemed as a hard problem. The world discovery model alternates between exploring and updating a descriptor of the world graph (e.g., graph 220) in an unsupervised fashion.

In some embodiments, for this first stage of exploration and discovery, the systems and methods of the present disclosure may employ or implement an unsupervised world discovery model. In some embodiments, the unsupervised world discovery model may correspond to, or be used to implement, unsupervised world discovery module 130 of computing device 100. In some embodiments, as further described herein, the unsupervised world discovery model employs or uses a recurrent differentiable binary latent model and a curiosity-driven goal-conditioned policy or agent.

In some examples, the most necessary pivotal states in recovering action sequences generated by the autonomous agent can be defined as $\mathcal{V}_p$. This indicates that these states ($s_p \in \mathcal{V}_p$) lead to the most information gain. In other words, given a trajectory $\tau = \{(s_t, a_t)\}_0^T$, the recurrent variational model learns to identify which state subset $\{s_t | s_t \in \mathcal{V}_p\}$ is sufficient to approximately infer the action sequence taken in $\tau$.

Figure 3:
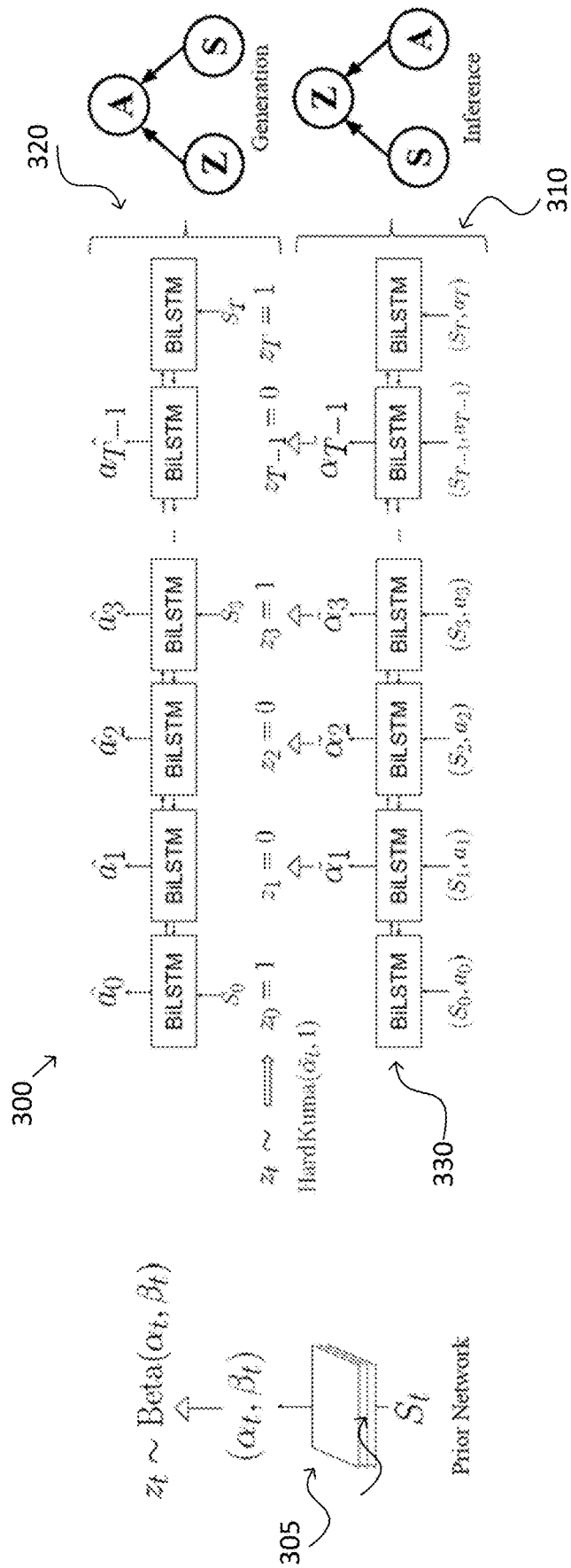
FIG. 3 is a simplified diagram of an unsupervised world discovery model, according to some embodiments.

Assuming that the state-action ($s_t$, $a_t$) trajectories are available, a recurrent variational inference model is formulated or developed for the world discovery model, as shown and described in more detail below with reference to FIG. 3. The model treats the action sequences as evidence and infers whether to keep a state for action recovery in a binary latent variable ($z_t$). In some examples, the model learns a prior over this inference decision conditioned on only the state (as opposed to the surrounding trajectory) and uses its output given state (s) as the criterion for including s in the necessary states $\mathcal{V}_p$.

In some embodiments, meaningful pivotal states $\mathcal{V}_p$ are learned from meaningful trajectories. Thus, the world discovery model alternately updates the recurrent differentiable binary latent model and the curiosity-driven goal-conditioned policy used by the agent to collect training trajectories. When collecting training trajectories, the agent is initialized using a state from the current iteration's set of $V_p$, naturally allowing the exploration starting points to expand as the agent discovers its environment or world. A random walk rollout policy can result in noisy trajectories that are perhaps irrelevant to real tasks. As such, the world discovery model learns a goal-conditioned policy $\pi_g$ for navigating between close-by states, reusing its observed trajectories for unsupervised learning. To ensure broad state coverage and diverse trajectories, a curiosity reward from the unsupervised action reconstruction error is added to learn $\pi_g$. The latent model may then be updated with new trajectories. This cycle is repeated until the action reconstruction accuracy plateaus. To complete the world graph $\mathcal{G}_w$ and form the edges, the world discovery model again uses both random trajectories and goal-conditioned policy or agent $\pi_g$, as further described herein. Lastly, the implicit knowledge of the environment or world embedded in policy $\pi_g$ can be further transferred to downstream tasks through weight initialization, as described below.

Recurrent Variational Model with Differentiable Binary Latent Variables.

As already mentioned, in some embodiments, the unsupervised world discovery model employs or uses a recurrent differentiable binary latent model. In some examples, the recurrent variational model with differentiable binary latent variables ($z_t$) is employed or used to discover the most necessary states ($V_p$) in recovering action sequences generated by the autonomous agent.

In some embodiments, the recurrent variational model can be implemented with an unsupervised world discovery model. FIG. 3 is a simplified diagram for the unsupervised world discovery model 300, according to some embodiments. The world discovery model 300 can be implemented as a neural network model which, according to some embodiments, includes an inference encoder 310 and a generation decoder 320.

The inference encoder 310, which can be implemented with one or more bi-directional long short-term memory (BiLSTM) 330 layers, receives state-action pairs $(s_t, a_t)$ as input. Given a trajectory $\tau$, the model treats the action sequence $\{a_t\}_0^{T-1}$ as evidence in order to infer a sequence of binary latent variables $z_t$.

In some examples, given a set of trajectories $\tau=\{(s_t, a_t)\}_0^T$, a fully differentiable recurrent variational auto-encoder is optimized with binary latent variables $z_t$, each designated to a state whose prior distribution (conditioning on the state $s_t$) is learned and indicates whether it belongs to the set of pivotal states $V_p$. Wide-ranging and meaningful training trajectories are therefore useful to the success of the latent model.

In some embodiments, the objective is to reconstruct the action sequence given only the states $s_t$ where $z_t=1$. During reconstruction, the boundary states $s_0$ and $s_T$ are always given. The evidence lower bound to optimize (ELBO) is $$\text{ELBO} = \mathbb{E}_{q_\phi(Z|A,S)}[\log p_\theta(A|S,Z)] + D_{KL}(q_\phi(Z|A,S) \| p_\psi(Z|S)). \quad (1)$$

To ensure differentiability, in some embodiments, the recurrent variational model uses a continuous relaxation of discrete binary latent variables by learning a Beta distribution as the priors z. Referring to FIG. 3, in some examples, a prior network 305 learns the state-conditioned prior in Beta distribution, $p_\psi(V_t|s_t)=\text{Beta}(\alpha_t, \beta_t)$. Moreover, the model learns the prior for $z_t$ conditioned on state $s_t$. The prior mean for each binary latent variable $z_t$ signifies on average how useful it is for action reconstruction. In this way, regularizing the approximated posterior with the learned prior (Equation 1) encourages similar trajectories to use the same states for action reconstruction. In some examples, the most necessary states ($V_p$) can be defined as the 20 states with the largest learned priors.

In some embodiments, the inference encoder 310 models the approximate posteriors using the Hard Kumaraswamy (HardKuma) distribution (as described in more detail in Basting et al., "Interpretable neural predictions with differentiable binary variables," 2019, which incorporated by reference herein). In some examples, the encoder 310 learns an approximate posterior in HardKuma distribution (HardKuma $(\tilde{\alpha}_t, \tilde{\beta}_t)$) for the binary latent variable $z_t$ inferred from state-action trajectories $(s_t, a_t)$'s, $q_\phi(z_t|s_t)=\text{HardKuma}(\tilde{\alpha}_t, 1)$. The HardKuma $(\tilde{\alpha}_t, \tilde{\beta}_t)$ resembles the Beta distribution but is outside the exponential family, since this choice allows sampling 0's and 1's without sacrificing differentiability. This is accomplished via a stretch-and-rectify procedure (as described in more detail in Basting et al., "Interpretable neural predictions with differentiable binary variables," 2019 and Louizos et al., "Learning sparse neural networks through l_0 regularization," arXiv preprint arXiv:1712.01312, 2017, both of which are incorporated by reference). In some examples, during training, the model samples from HardKuma $(\tilde{\alpha}_t, 1)$ using a reparametrization trick (as described in more detail in Kingma et al., 'Auto-encoding variational bayes," In ICLR, 2013, which is incorporated by reference). Lastly, the KL-divergence between Kuma distribution and Beta distribution can be approximated in closed form. The model fixes $\tilde{\beta}_t=1$ to ease optimization since the Kuma and Beta distributions coincide when $\alpha_i=\tilde{\alpha}_i, \beta_i=\tilde{\beta}_i=1$.

Referring again to FIG. 3, the generation decoder 320, which also can be implemented with one or more BiLSTM layers, reconstructs the action sequence $\{a_t\}_0^{T-1}$ from $\{s_t | z_t=1\}$. In some embodiments, to prevent the model from selecting all states to reconstruct $\{a_t\}_0^{T-1}$, the model imposes a regularization on the expected $L_0$ norm of $Z=(z_1 \ldots z_{T-1})$ to promote sparsity at a targeted value $\mu_0$. In other words, this objective constraints that there should be $\mu_0$ of activated $z_t=1$. Another similarly constructed transition regularization encourages isolated activation of $z_t$, meaning the number of transitions between 0 and 1 among z's should roughly be $2\mu_0$. Note that both expectations in Equation 2 have closed forms for HardKuma.

$$\mathcal{L}_0 = \| \mathbb{E}_{q_\phi(Z|S,A)}[\|Z\|_0] - \mu_0 \|^2, \mathcal{L}_T = \| \mathbb{E}_{q_\phi(Z|S,A)} \Sigma_{t=0}^T \mathbb{1}_{z_t \neq z_{t+1}} - 2\mu_0 \| \quad (2)$$

Lagrangian Relaxation.

In some embodiments, the overall optimization objective comprises action sequence reconstruction, KL-divergence, $\mathcal{L}_0$ and $\mathcal{L}_T$ (Equation 3). The objective weights $\lambda_i$ are tuned using Lagrangian relaxation (as described in more detail, for example, in Higgins et al., "beta-vae: Learning basic visual concepts with a constrained variational framework"; Basting et al., Interpretable neural predictions with differentiable binary variables. 2019; D. P. Bertsekas, *Nonlinear Programming*, all of which are incorporated by reference), treating the weight s as learnable parameters and performing alternative optimization between $\lambda_i$'s and the model parameters. It is observed that as long as their initialization is within a reasonable range, $\lambda_i$'s will converge to local optimum.

$$\max_{\{\lambda_1,\lambda_2,\lambda_3\}} \min_{\{\theta,\phi,\psi\}} \mathbb{E}_{q(Z|A,S)}[\log p(A|S,Z)] + \quad (3)$$
$$\lambda_1 D_{KL}(q_\phi(Z|A,S) \| p_\psi(Z|S)) + \lambda_2 \mathcal{L}_0 + \lambda_3 \mathcal{L}_T$$

In some embodiments, the finalized latent model allows efficient and stable mini-batch training. Alternative designs, such as Poisson prior for latent space and Transformer for sequential modeling (as described in more detail, for example, in Kipf et al., "Compositional imitation learning: Explaining and executing one task at a time," arXiv preprint arXiv:1812.01483, 2018; and Vaswani et al., "Attention is all you need," in *Advances in neural information processing systems*, pages 5998-6008, 2017, both of which are incorporated by reference) are also possibilities in some embodiments.

Curiosity-Driven Goal-Conditioned Agent. In some embodiments, a goal-conditioned agent or policy, $\pi(a_t|s_t, g)$, or $\pi_g$, is trained to reach goal state $g \in S$ given current state $s_t$. For large state spaces, training a goal-conditioned policy to navigate between any two states can be non-trivial. However, in some examples, the use-cases of the present disclosure (including trajectory generation for unsupervised learning and navigation between nearby pivot states in downstream tasks), only requires $\pi_g$ to reach goals over a short range. In some embodiments, the agent or policy is trained by sampling goals using a random walk from a given starting state. In some examples, the readily available action reconstruction errors from the generative decoder can be leveraged as an intrinsic reward signal to boost exploration when training the agent or policy, $\pi_g$.

Edge Connection.

A step (in some embodiments, a last or close to last step) towards completion of the world graph $\mathcal{G}_w$ is building the edge connections. In some examples, after finalizing the set of pivotal states $\mathcal{V}_p$, the agent performs random walks from $s_p \in \mathcal{V}_p$ to discover the underlying adjacency matrix connecting individual $s_p$'s. In some embodiments, a directed edge $s_p \to s_q$ is claimed or added to the world graph if there exist a random walk trajectory from $s_p$ to $s_q$ that does not intersect a separate pivotal state. In some embodiments, the shortest such paths are collected or included as the graph edges. The goal-conditioned agent or policy $\pi_g$ can further refine each path by using trajectories collected from the policy when substituting $s_p$ and $s_q$ for the starting state and goal state. For stochastic or partially observable environments, in some embodiments, we may rely entirely on $\pi_g$ rather than count on memorized paths.

Accelerated Hierarchical Reinforcement Learning

A hierarchical reinforcement learning (HRL) module leverages the world graph $\mathcal{G}_w$ to accelerate learning downstream tasks. In some embodiments, this module can correspond to or implement the hierarchical reinforcement learning module 135 in FIG. 1. Aspects of the hierarchical reinforcement learning module can include the following: Wide-then-Narrow Manager instruction, (2) world graph $\mathcal{G}_w$ traversal, and (3) knowledge transfer via initialization from the goal-conditioned agent or policy $\pi_g$. Each aspect may be generally applicable to many different HRL algorithms. In some examples, the hierarchical reinforcement learning module may be implemented with or incorporate an Advantage Actor-Critic (A2C) model and/or its hierarchical extension, Feudal Network. In some embodiments, the A2C model can serve as a baseline.

A2C Model and Feudal Network.

In some embodiments, a standard discrete time step is considered, discounted reinforcement learning (RL) setup. In some embodiments, an agent, controlled by policy $\pi(a_t|s_{t-1})$ and receiving reward $r_t$ at time t, is trained to maximize its cumulative expected return over time $R = \mathbb{E}_{(s_t, a_t) \sim \pi}[r_t]$.

The hierarchical reinforcement learning (HRL) module of the present disclosure can employ or be implemented with (as well as compared against) the Advantage Actor-Critic (A2C) algorithm or model. A2C is a popular and relatively simple-to-use, model-free, on-policy RL algorithm. In some embodiments, the recurrent A2C-LSTM (long short-term memory) variant is used as a baseline, as well as its hierarchical version. As an on-policy algorithm, A2C learns a value function V for estimating future cumulative discounted reward given current state $s_t$ and adjusts the probability given by the policy to actions based on the advantage of the observed reward compared to that predicted by V. Typically (and as may be done here), policy optimization includes entropy regularization ($\mathcal{H}$) to prevent premature convergence. Feudal Networks (FN) are a hierarchical extension of A2C.

In some embodiments, the systems and method of the present disclosure may employ or incorporate a Feudal Network (FN) model. In some examples, Feudal Network (FN) model implements or provides a general hierarchical reinforcement learning (HRL) scheme with novel components, such as Wide-then-Narrow (WN) instruction and navigating via world graph traversal. In some embodiments, Feudal Network (FN) model can be used to implement hierarchical reinforcement learning (HRL) module (e.g. module 135 of FIG. 1).

Figure 4:
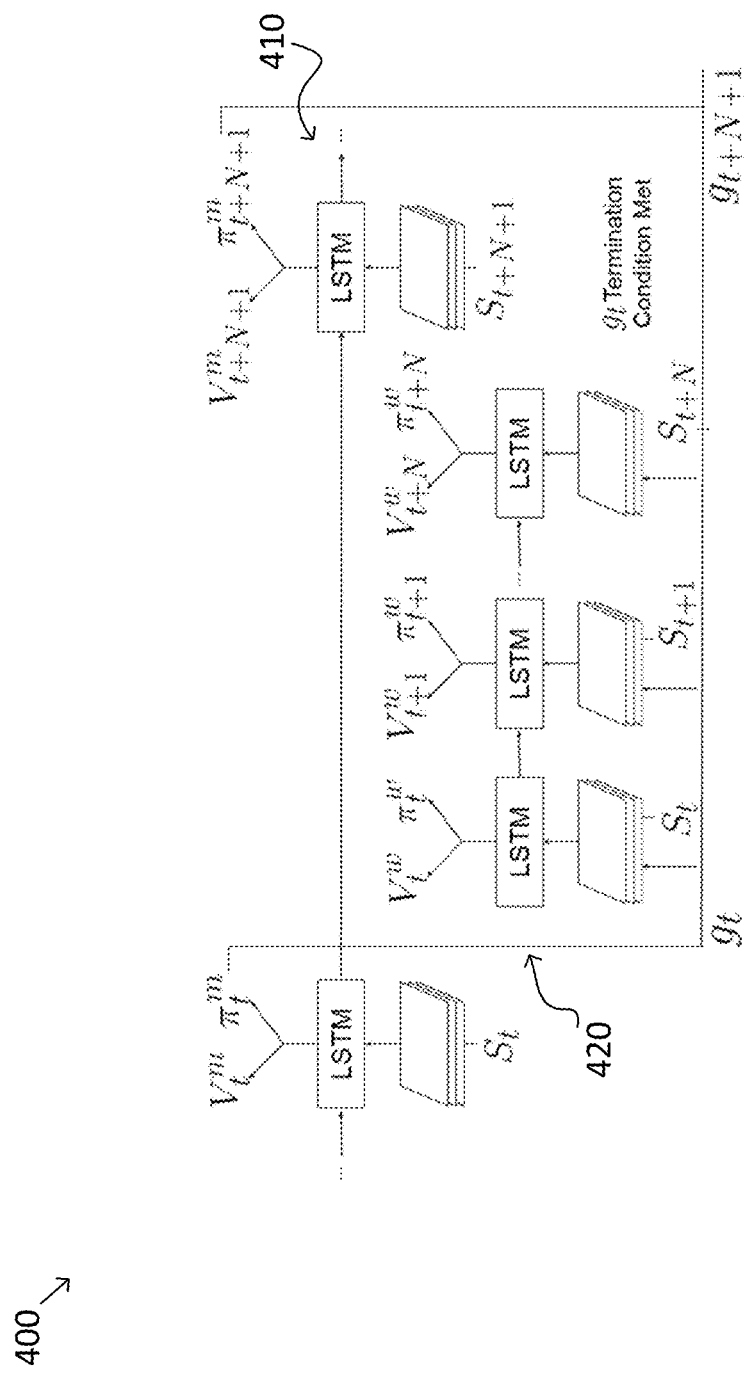
FIG. 4 a simplified diagram of a Feudal Network (FN) model for hierarchical reinforcement learning, according to some embodiments.

FIG. 4 is a simplified diagram for an implementation 400 of a Feudal Network (FN) model, according to some embodiments. The FN model defines a hierarchy with multiple levels of components or controllers, each of which learns and is rewarded. As shown, the FN model implementation 400 includes a Manager 410 and a Worker 420. The Manager 410 is a high-level controller. Manager 410 learns to propose subgoals to a low-level controller, i.e. the Worker 420. Worker 420 learns to complete the subgoals proposed by Manager 410. The Manager 410 receives rewards from the environment based on the actions taken by the Worker 420. The Worker 420 receives rewards for completing the subgoals provided by the Manager 410. In some embodiments, each of Manager 410 and Worker 420 can be implemented as A2C-LSTMs, for example, operating at different temporal resolutions.

In some embodiments, the high- and low-level components learn distinct networks that operate at different temporal resolutions, such that the Manager 410 only outputs a new subgoal if either the Worker 420 completes its current one or a subgoal horizon c is exceeded. Because the mazes (relating to environments) in some examples are finite and fully observable, the set of subgoals we can be precisely characterized. The baseline FN model can select any well-defined state as a subgoal, i.e. the Manager 410 policy network emits a probability vector of dimension |S|.

Wide-then-Narrow Manager Instruction.

According to some embodiments, the hierarchical reinforcement learning (HRL) approach of the present disclosure is employed or utilized to incorporate the world graph for solving specific downstream tasks. Within the paradigm of goal-conditioned HRL, the approach innovates how the high-level Manager 410 provides goals and how the low-level Worker 420 navigates. Instead of sending out a single objective, the Manager 410 first selects a pivotal state from the world graph and then specifies a final goal within a nearby neighborhood of the pivotal state. Such sequential selection is referred to as a Wide-then-Narrow (WN) instruction. In this way, because navigation from its nearby pivotal state to the desired one is greatly simplified due to applying graph traversal techniques on the world graph, the Worker 420 can focus more on achieving local objectives.

In other words, to adapt the world graph $\mathcal{G}_w$ from the unsupervised learning procedure to the HRL framework, in some embodiments, a way is needed to express any state as a subgoal while still constraining the output of Manager 410 according to the abstraction provided by the graph. To that end, in some embodiments, a Wide-then-Narrow (WN) mechanism is employed or used for modeling Manager outputs.

Figure 5:
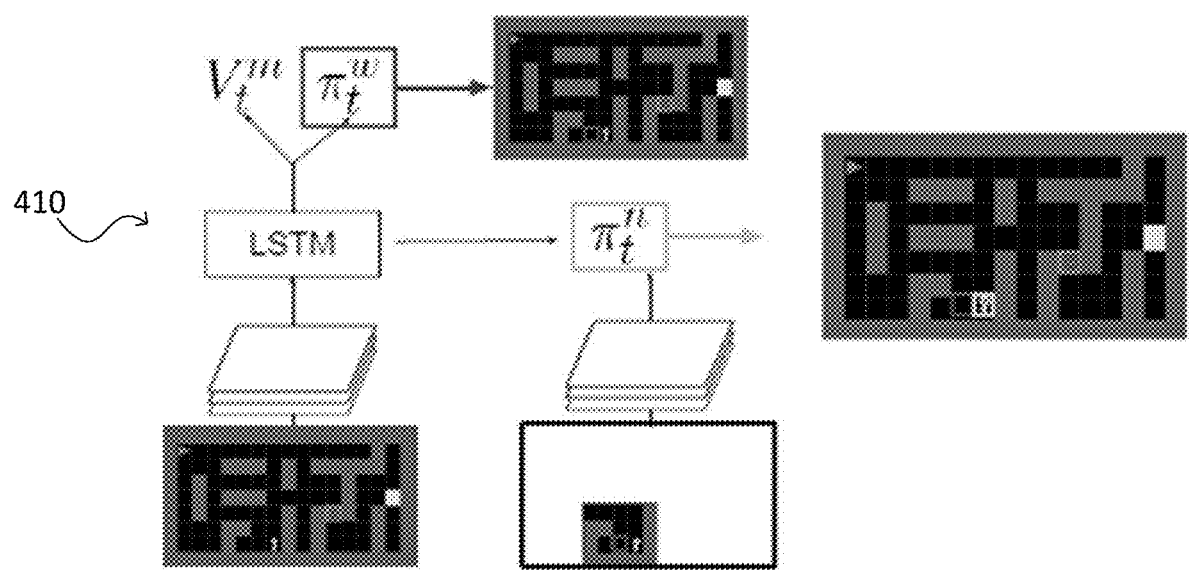
FIG. 5 illustrates an example of a Wide-then-Narrow Manager instruction, according to some embodiments.

FIG. 5 illustrates an example of a proposed Wide-then-Narrow Manager instruction, where Manager 410 first outputs a wide goal $g_w$ from a pre-defined set of candidate states $\mathcal{V}$, e.g. $\mathcal{V}_p$, and then zooms in to attend a closer up area $s_w$ around $g_w$ to narrow down the final subgoal $g_n$.

That is, in some embodiments, given a pre-defined set of candidate states denoted $\mathcal{V}$, the Manager 410 follows a "wide-goal" policy $\pi^w$ derived from global context $s_t$ and outputs a "wide" subgoal $g_w \in \mathcal{V}$. It is proposed to use the learned pivotal states $\mathcal{V}_p$ as this set $\mathcal{V}$. After selecting this "wide-goal" $g_w$, the Manager 410 zooms its attention to an N×N local area $s_w$ around $g_w$. Taking into account both global $s_t$ and local $s_w$ information, a "narrow-goal" policy $\pi^n$ selects a final, "narrow" goal $g_n \in s_w$, which is then passed to the Worker 420 as its next subgoal. The policy gradient is straightforward to modify but the entropy regularization $\mathcal{H}$ may become intractable when the state spaces grow large. Thus, in some embodiments, a functional approximation of entropy regularization $\mathcal{H}$ is used, and the final Manager policy network update is obtained, where $A_{m,t}$ is the Manager's advantage at time t:

$$\nabla_\theta A_{m,t} \log \pi^w(g_{w,t}|s_t)\pi^n(g_{n,t}|s_t,g_{w,t},s_{w,t}) + \nabla_\theta H(\pi^w) + \nabla_\theta \mathcal{H}(\pi^n(\cdot|g_{w,t})).$$

Figure 6A:
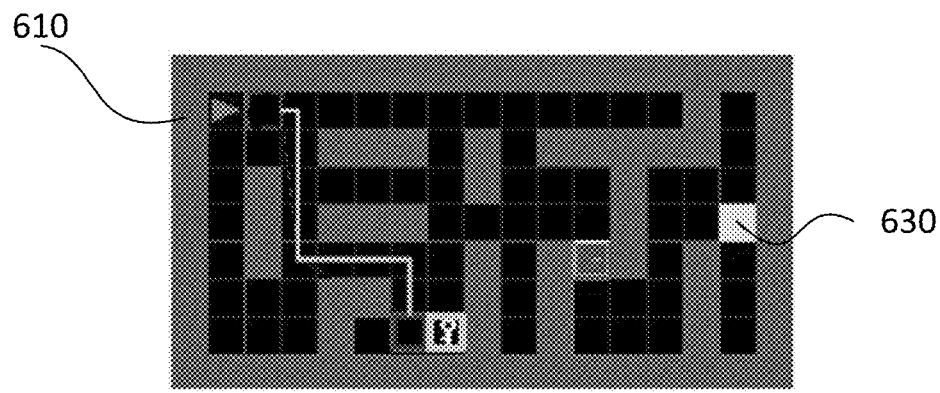
FIGS. 6A-6D illustrate an example of a series of Wide-then-Narrow Manager instructions and world graph traversals, according to some embodiments.
Figure 6B:
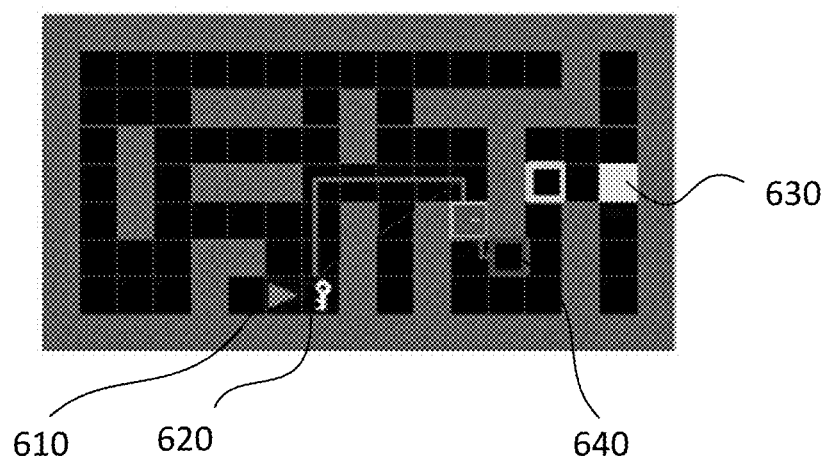
Figure 6C:
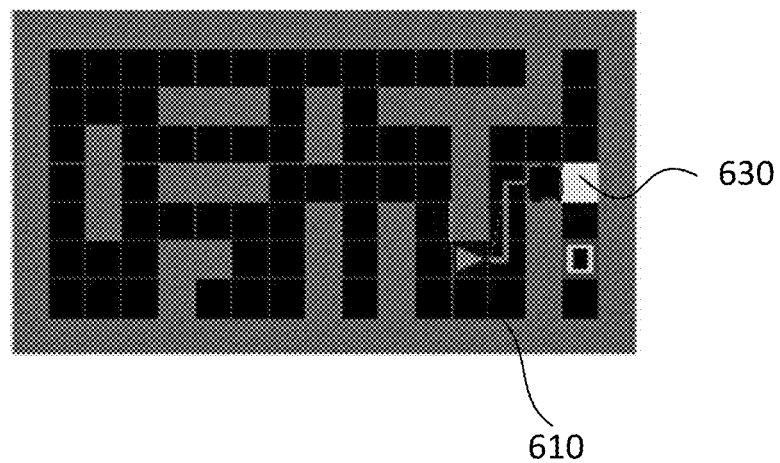
Figure 6D:
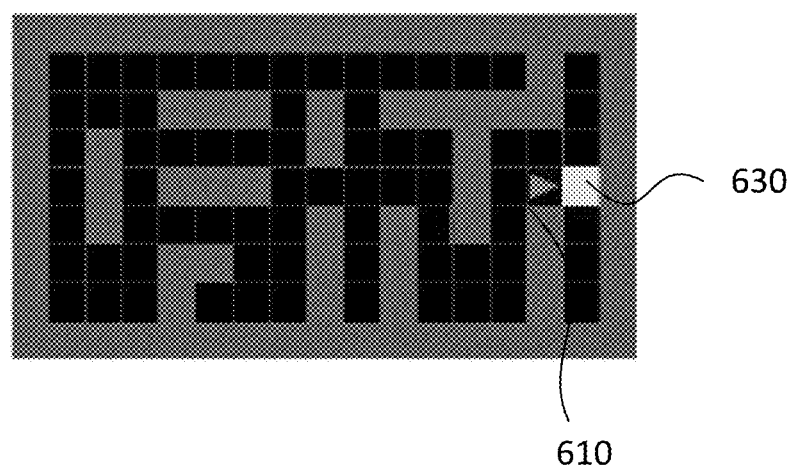

FIGS. 6A-6D illustrate an example of a series of Wide-then-Narrow Manager instructions and world graph traversals, carried out by an agent 610 solving a challenging Door-Key maze task, according to some embodiments. These can occur in the environment 200 using graph 220 illustrated in FIG. 2. In FIG. 6A, the agent 610 hits several nodes and then traverses to other nodes, picks up the key 620, all on the way to reaching the manager goal 630. In FIG. 6B, a door 640 blocks the agent's traversal path to the manager goal 630. Agent 610 navigates on its own and opens the door 640. In FIG. 6C, manager goal expires and gets updated. The agent moves toward manager goal 630 and hits more nodes. In FIG. 6D, on its traversal course to manager goal 630, the agent 610 hits final target and exits.

World Graph Traversal.

By limiting the set of wide-goal options to pivotal states, i.e. set $\mathcal{V} = \mathcal{V}_p$, the systems and methods of the present disclosure can take advantage of the edge connections in the world graph. In one illustrative example, when the Worker (e.g., Worker 420) is in pursuit of $g_n$ in the neighborhood of $g_w$, it is allowed to re-use the traversal edges stored in $\mathcal{G}_w$ when it encounters a state that is part of the graph. Specifically, if the agent encounters a pivotal state $s_p = \mathcal{V}_p$ such that there is a path on $\mathcal{G}_w$ to the wide-goal $g_w$, as if leveraging a memorized repertoire of behavior. In some examples, the optimal traversal route can be estimated based on edge information via, e.g., dynamic programming. If a new blockage in the environment (i.e., a door) makes the traversal unviable, the Worker is not allowed to use it and the Manager (e.g., Manager 410) is expected to learn to plan accordingly. This behavior has been demonstrated in our experiments. World graph traversal potentially allows the Manager to assign more task-relevant goals that are far away, speeding up training of high-level control by outsourcing basic planning of transportation. For the same reason, the Worker may also concentrate on learning to operate towards the localized $g_n$ after arriving at $g_w$. Another foreseeable benefit is the enhancement of exploration, as the agent is no longer restricted to lingering around its current position.

Transfer from Goal-Conditioned Policy Via Initialization.

In some embodiments, the goal-conditioned policy derived from learning the world graph can serve as an initialization to the Worker (e.g., Worker 420), allowing fast skill transfer to new tasks as demonstrated by our experiments.

That is, in some embodiments, the implicit knowledge of the world acquired by policy $\pi_g$ can be leveraged in the subsequent HRL training. Transferring and generalizing skills between tasks in the context of reinforcement learning (RL) is an important practice often leading to performance gain. It has been demonstrated that a goal-conditioned policy can capture the underlying structure of the environment and actionable representations derived from such policy are beneficial for other tasks. Additionally, it has been demonstrated that optimization of deep neural networks is sensitive to weight initialization, especially for a system like HRL due to its complexity and lack of clear supervision. Therefore, according to some embodiments, the systems and methods of the present disclosure attempt to achieve both implicit skill transfer and improved optimization by using the weights from policy $\pi_g$ to initialize the Worker and the Manager.

Method

Figure 7:
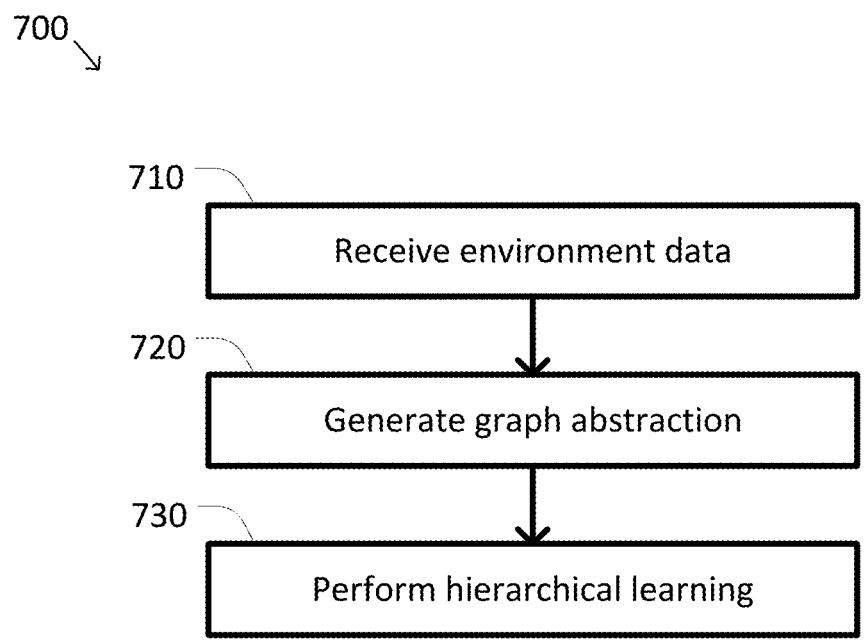
FIG. 7 is a simplified diagram of a method of learning world graphs to accelerate hierarchical reinforcement learning, according to some embodiments.

FIG. 7 is a simplified diagram of a method 700 for learning world graphs to accelerate hierarchical reinforcement learning for training of a machine learning system, e.g., implementing an autonomous agent, according to some embodiments. One or more of the processes 710-730 of method 700 may be implemented, at least in part, in the form of executable code stored on non-transitory, tangible, machine-readable media that when run by one or more processors may cause the one or more processors to perform one or more of the processes 710-730. In some embodiments, method 700 may correspond to the method used by computing device 100, including unsupervised world discovery module 130 and hierarchical reinforcement learning module 135 to develop, derive, or generate world graphs and perform accelerated hierarchical reinforcement learning (HRL) by integrating the graph; as such, further details for the processes 710-730 are provided above.

At a process 710, input data 140 is received at computing device 100. In some examples, the input data 140 may include data relating to one or more environments, which can be real-world or virtual, in which the agent may operate. The input data 140 may also include data relating to one or more tasks that the agent may be assigned to perform in the environment. The environment data and the task data may be provided to unsupervised world discovery module 130 and/or hierarchical reinforcement learning module 135.

At a process 720, based on the environment data 140, unsupervised world discovery module 130 generates a graph abstraction (world graph $\mathcal{G}_w$) for representing the environment. The graph abstraction may include or define nodes and edges, where nodes are important points of interest (pivotal states) in the environment and edges represent feasible traversals between the nodes. In some embodiments, to generate the graph abstraction, unsupervised world discovery module 130 includes or implements a recurrent differentiable binary latent model to discover the most necessary pivotal states $\mathcal{V}_p$. In some embodiments, unsupervised world discovery module 130 also includes or implements a curiosity-driven goal-conditioned policy agent $\pi_g$, which may be trained. The graph abstraction is provided as input 145 to hierarchical reinforcement learning module 135.

At a process 730, hierarchical reinforcement learning module 135 performs hierarchical reinforcement learning (HRL) to train the agent controlled by the policy. In some embodiments, this can be accomplished, for example, by integrating the graph abstraction (world graph $\mathcal{G}_w$). In some embodiments, hierarchical reinforcement learning module 135 may implement or employ a Wide-then-Narrow (WN) mechanism, by which a Manager follows or sets both "wide" goals and "narrow" goals for itself and the Worker. The Manager, uses the world graph $\mathcal{G}_w$ to quickly find solutions to new tasks and expresses subgoals in reference to their nearby pivotal states to the Worker. The Worker then can use the graph to traverse and explore in long range.

In some embodiments, based upon the accelerated learning, the computing device 100, derives or generates results and predictions which can be, for example, instructions by which the agent can navigate in the environment and perform the downstream tasks. These results or predictions are provided as output 150 from computing device 100.

Some examples of computing devices, such as computing device 100 may include non-transitory, tangible, machine readable media that include executable code that when run by one or more processors (e.g., processor 110) may cause the one or more processors to perform the processes of method 700. Some common forms of machine readable media that may include the processes of method 700 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Experiments and Results

The effectiveness of the systems and methods disclosed herein, including the unsupervised world discovery module 130 and the hierarchical reinforcement learning module 135 of the framework, were validated and their impact assessed in a thorough ablation study on three challenging maze tasks with different reward structures and logic.

The maze tasks for ablation studies were MultiGoal, MultiGoal-Sparse, and Door-Key. In MultiGoal, the agent needs to collect 5 randomly spawned balls and exit from a designated exit point. Reaching each ball or the exit point gives reward $r_t$=+1. Its sparse version, MultiGoal-Sparse, only gives a single reward $r_T$ proportional to the number of balls collected upon exiting at final time T. Door-Key is a much more difficult task that adds new actions ("pick" and "open") and new objects to the environment (additional walls, doors, keys). The agent needs to pick up the key, open the door (reward+1) and reach the exit point on the other side (reward+1), as illustrated in FIGS. 5A-D. Lastly, every action taken by the agent receives a negative reward −0.01.

For the experiments, the Advantage Actor-Critic (A2C) and Feudal Network (FN) models served as non-hierarchical and hierarchical baselines. Wide-then-Narrow (WN) instruction was augmented on top of FN with 1 of 3 possible sets of $\mathcal{V}$'s for the Manager to pick $g_w$ from: $\mathcal{V}_{all}$ includes all valid states, $\mathcal{V}_{rand}$ are uniformly sampled states, $\mathcal{V}_p$ are learned pivotal states, $\mathcal{V}_p$ and $\mathcal{V}_{rand}$ are of the same size.

The edge connections were computed for $\mathcal{V}_{rand}$ and $\mathcal{V}_p^1$, and $\mathcal{G}_w$ traversal added on top of WN. Neither the goal-conditioned policy $\pi_g$ nor guaranteed state access is available to $\mathcal{V}_{rand}$, but otherwise all pre-requisites are granted to the random case for the fairest comparison possible. Finally, all experiments were repeated with $\pi_g$ initialization. Again, $\pi_g$ is given to $\mathcal{V}_{all}$ and $\mathcal{V}_{rand}$ for free.

Most hyperparameters from the training of $\pi_g$ are inherited, as Manager and Worker both share similar architecture as $\pi_g$. The hyperparameters of $\pi_g$ in turn follow those from as described in more detail in Shang et al., "Stochastic activation actor-critic methods," 2018, which is incorporated by reference herein. Because these tasks are more difficult than goal-orientation, the maximal number of training iterations was increased from 36K to 100K and the rollout steps for each iteration from 25 to 60. Hyperparameters specific to hierarchical reinforcement learning (HRL) are the horizon c=20 and the size of $s_w$, N=5 for small and medium, N=7 for large. A rigorous evaluation protocol acknowledging the variability in Deep RL was followed: each experiment was repeated with 3 seeds, 10 additional validation seeds were used to pick the best model which was then tested on 100 testing seeds.

Figure 8:
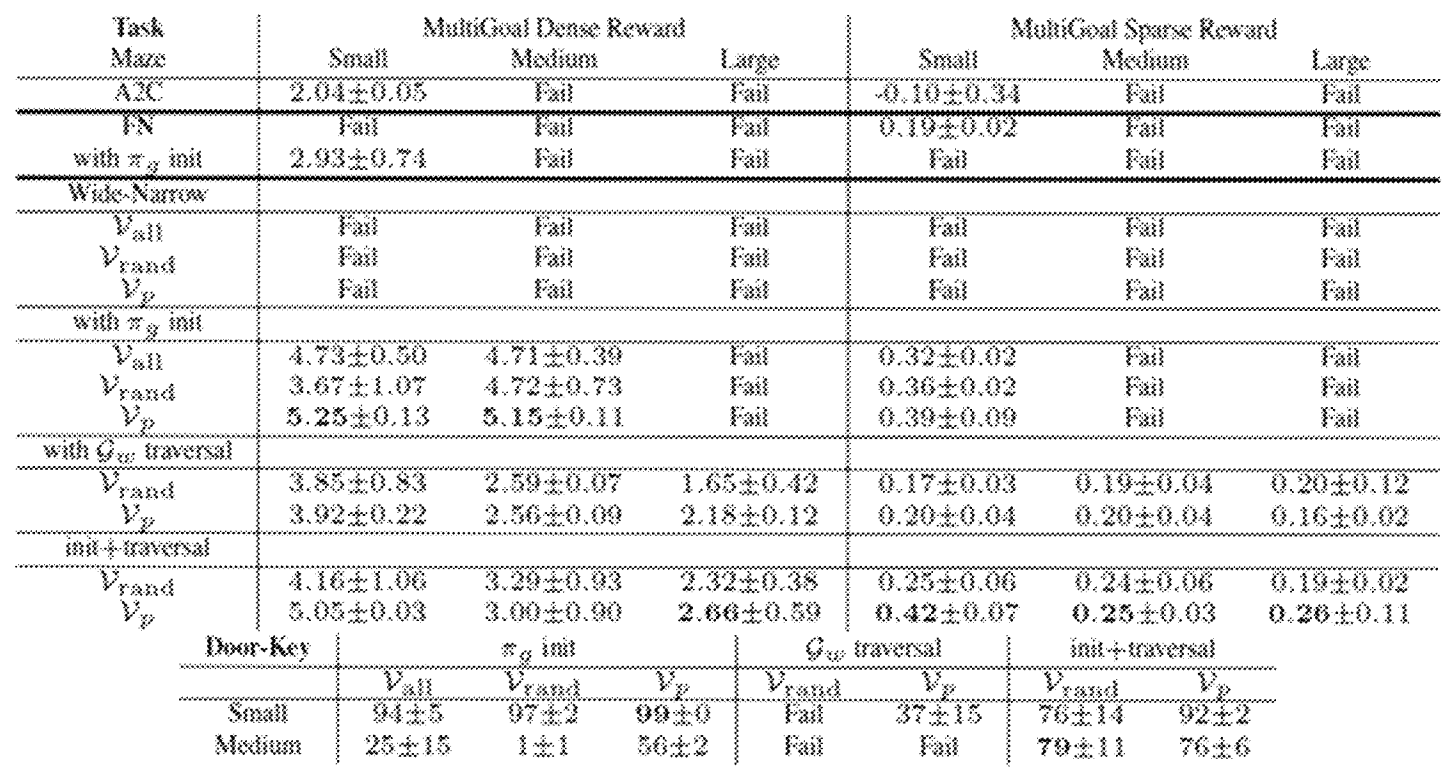

Mean and variance of testing results are summarized in Table 1, as shown in FIG. 8. The top of Table 1 provides experimental results over MultiGoal and MultiGoal-Sparse maze tasks on small, medium, and large mazes (average reward±std). The bottom of Table 1 provides experimental results over a Door-Key maze task on small and medium mazes (average success rate in %±std). "Fail" indicates training was either not initiated or validation rewards were never above 0.

Transfer via Initialization. Table 1 shows initialization with $\pi_g$ is crucial across all tasks, especially for the hierarchical models—e.g. a randomly initialized A2C outperforms a randomly initialized FN on small-maze MultiGoal. Models starting from scratch fail on almost all tasks unless coupled with $\mathcal{G}_w$ traversal, which is still inferior to their $\pi_g$ initialized counterparts. These results also corroborate the claim that goal-conditioned policies are a promising venue for task transfer.

Wide-then-Narrow.

Comparing A2C, FN and $\mathcal{V}_{all}$ suggests WN is a highly effective way to structure Manager subgoals. For example, in small MultiGoal, $\mathcal{V}_{all}$ (4.73±0.5) surpasses FN (2.93±0.74) by a large margin. It is posited that Manager tends to select g, from a certain smaller subset of $\mathcal{V}$, simplifying the learning of transitions between g, s for the Worker. As a result, the Worker can focus on solving local objectives. The same reasoning conceivably explains why $\mathcal{G}_w$ traversal does not yield performance gains on small and medium MultiGoal. For instance, $\mathcal{V}_p$ on small MultiGoal scores 5.25±0.13, slightly higher than with traversal 5.05±0.13. However once transitions become more difficult with larger mazes, the Worker starts to fail discovering these transitions and at the end also the task, e.g., on large MultiGoal.

World Graph Traversal.

In the case described above, the addition of world graph traversal plays an essential role, e.g. for the large MultiGoal maze task. This phenomenon can be explained by the much expanded exploration range and a lift of responsibility to learn long distance transitions from the Worker, both due to $\mathcal{G}_w$. The experiments confirmed that $\mathcal{G}_w$ traversal speeds up convergence, more evidently with larger mazes. In the Door-Key maze task, the agent needs to plan and execute a particular combination of actions. The huge discrepancy on medium Door-Key maze task between using traversal or not, 75±6 vs 56±2, suggests $\mathcal{G}_w$ traversal improves long-horizon planning.

Role of $\mathcal{V}_p$.

Comparing $\mathcal{V}_p$ to $\mathcal{V}_{rand}$ intuits the quality of pivotal states identified by the recurrent differentiable binary latent model of the present disclosure. Overall, $\mathcal{V}_p$ either exhibits better or comparable results as $\mathcal{V}_{rand}$, but with much less variance between different seeds. If one luckily picks a set of random states suitable for a task, it can deliver great results but the opposite is equally possible. Besides, edge formation between the random states still heavily relies on the learning of $\mathcal{G}_w$ and $\mathcal{V}_p$ to properly explore the world while learning $\pi_g$. Therefore, the favorable performance of $\mathcal{V}_{rand}$ does not undermine the value of world graph discovery.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A system for training a machine learning system, the system comprising:
   a communication interface that receives environment data, the environment data relating to an environment in which the machine learning system may operate;
   a memory containing machine readable medium storing machine executable code; and
   one or more processors coupled to the memory and configurable to execute the machine executable code to:
   generate, by implementing a recurrent differentiable binary latent model, from the environment data a graph abstraction for the environment, the graph abstraction comprising a plurality of nodes and edges, wherein nodes represent points of interest in the environment and edges represent traversals between the nodes; and
   perform hierarchical reinforcement learning using the graph abstraction to train the machine learning system.

2. The system of claim 1, wherein the one or more processors configurable to execute the machine executable code discover one or more pivotal states in the environment.

3. The system of claim 2, wherein the one or more processors configurable to execute the machine executable code generate edge connections for the graph abstraction using the one or more pivotal states.

4. The system of claim 1, wherein the one or more processors configurable to execute the machine executable code implement a goal-conditioned agent to sample goals in a random walk of the graph abstraction.

5. The system of claim 4, wherein knowledge gained in by the goal-conditioned agent in the random walk of the graph abstraction is transferred to subsequent tasks for the machine learning system.

6. The system of claim 1, wherein the recurrent differentiable binary latent model infers a sequence of binary latent variables to discover one or more pivotal states in the environment.

7. The system of claim 1, wherein the one or more processors configurable to execute the machine executable code execute a Wide-then-Narrow Instruction.

8. The system of claim 7, wherein options for the Wide-then-Narrow Instruction are limited to pivotal states discovered during the generation of the graph abstraction.

9. The system of claim 1, wherein the one or more processors configurable to execute the machine executable code implement a Feudal Network to perform the hierarchical reinforcement learning.

10. A method for training a machine learning system comprising:
    receiving, at one or more processors, environment data, the environment data relating to an environment in which the machine learning system may operate;
    generating, by implementing a recurrent differentiable binary latent model, from the environment data, at the one or more processors, a graph abstraction for the environment, the graph abstraction comprising a plurality of nodes and edges, wherein nodes represent points of interest in the environment and edges represent traversals between the nodes; and
    performing hierarchical reinforcement learning, at the one or more processors, using the graph abstraction to train the machine learning system.

11. The method of claim 10, wherein generating the graph abstraction for the environment comprises discovering one or more pivotal states in the environment.

12. The method of claim 11, wherein generating the graph abstraction for the environment comprises generating edge connections for the graph abstraction using the one or more pivotal states.

13. The method of claim 10, wherein generating the graph abstraction for the environment comprises employing a goal-conditioned agent to sample goals in a random walk of the graph abstraction.

14. The method of claim 13, wherein performing the hierarchical reinforcement learning comprises transferring knowledge gained by the goal-conditioned agent in the random walk of the graph abstraction to subsequent tasks for the machine learning system.

15. The method of claim 10, wherein generating the graph abstraction for the environment comprises inferring a sequence of binary latent variables to discover one or more pivotal states in the environment.

16. The method of claim 10, wherein performing the hierarchical reinforcement learning comprises executing a Wide-then-Narrow Instruction.

17. The method of claim 16, wherein options for the Wide-then-Narrow Instruction are limited to pivotal states discovered during the generation of the graph abstraction.

18. The method of claim 10, wherein a Feudal Network is used to perform the hierarchical reinforcement learning.

* * * * *